（12） United States Patent
Nakagawa et al.

(10) Patent No.: US 6,244,749 B1
(45) Date of Patent: Jun. 12, 2001

(54) DYNAMIC PRESSURE BEARING DEVICE AND METHOD FOR MANUFACTURING SAME

(75) Inventors: Hisaya Nakagawa; Michiaki Takizawa; Masamichi Hayakawa, all of Nagano (JP)

(73) Assignee: Kabushiki Kaisha Sankyo Seiki Sesakusho, Nagano (JP)

( * ) Notice: Subject to any disclaimer, the term of this patent is extended or adjusted under 35 U.S.C. 154(b) by 0 days.

(21) Appl. No.: 09/451,780

(22) Filed: Dec. 1, 1999

(30) Foreign Application Priority Data

Dec. 1, 1998 (JP) .................................................. 10-341958

(51) Int. Cl.$^7$ ...................................................... F16C 17/02
(52) U.S. Cl. .......................... 384/114; 384/118; 384/279; 384/902
(58) Field of Search .................................... 384/114, 118, 384/279, 902, 115, 107

(56) References Cited

U.S. PATENT DOCUMENTS 5,675,201 * 10/1997 Komura et al. .

6,000,850 * 12/1999 Takahashi et al. .

* cited by examiner

Primary Examiner—Lenard A. Footland
(74) Attorney, Agent, or Firm—Sughrue, Mion, Zinn, Macpeak & Seas, PLLC

(57) ABSTRACT

The dynamic pressure bearing device is structured such that the pores of porous material as they are are disposed in the surfaces thereof forming the negative pressure cancel portions 15b and a lubricating fluid is supplied to the negative pressure generating areas thereof through the pores of the negative pressure cancel portions 15b, whereby, even if recess-shaped grooves forming the negative pressure cancel portions 15b are formed shallow in depth and wide in width, or even if such grooves themselves are not formed at all, the dynamic pressure bearing device is able to fulfill its negative pressure cancel function in a sufficient manner. This makes it possible to eliminate the need for provision of the conventional recess-shaped grooves which are formed deep and narrow, thereby eliminating the need to execute an expensive operation such as a cutting operation or the like, so that the negative pressure cancel portions 15b can be formed at a low cost by inexpensive means such as by molding or the like.

7 Claims, 5 Drawing Sheets

DYNAMIC PRESSURE BEARING DEVICE AND METHOD FOR MANUFACTURING SAME

BACKGROUND OF THE INVENTION

1. Field of the Invention

The present invention relates to a dynamic pressure bearing device which allows a lubricating fluid to generate a dynamic pressure and supports a shaft member and a bearing member by such dynamic pressure in such a manner that the two members can be relatively rotated with respect to each other, and a method for manufacturing such dynamic pressure bearing device.

2. Related art

In recent years, there have been proposed various kinds of dynamic pressure bearing devices which are used to rotationally support various rotary bodies such as a polygon mirror, a magnetic disk, an optical disk and the like. In the dynamic pressure bearing device of this type, a dynamic pressure bearing surface situated on the shaft member side and a dynamic pressure bearing surface on the bearing member side are disposed in such a manner that they are opposed to each other in the radial direction of the dynamic pressure bearing device with a given clearance between them; and, a lubricating fluid such as air, oil or the like poured or charged into the clearance, when the shaft member or bearing member is rotated, is pressurized due to the pumping action of the dynamic pressure bearing surfaces of the shaft member and bearing member to thereby generate a dynamic pressure and thus the two members, that is, the shaft member and bearing member can be supported by the thus generated dynamic pressure of the lubricating fluid in such a manner that they can be relatively rotated with respect to each other.

Figure 7:
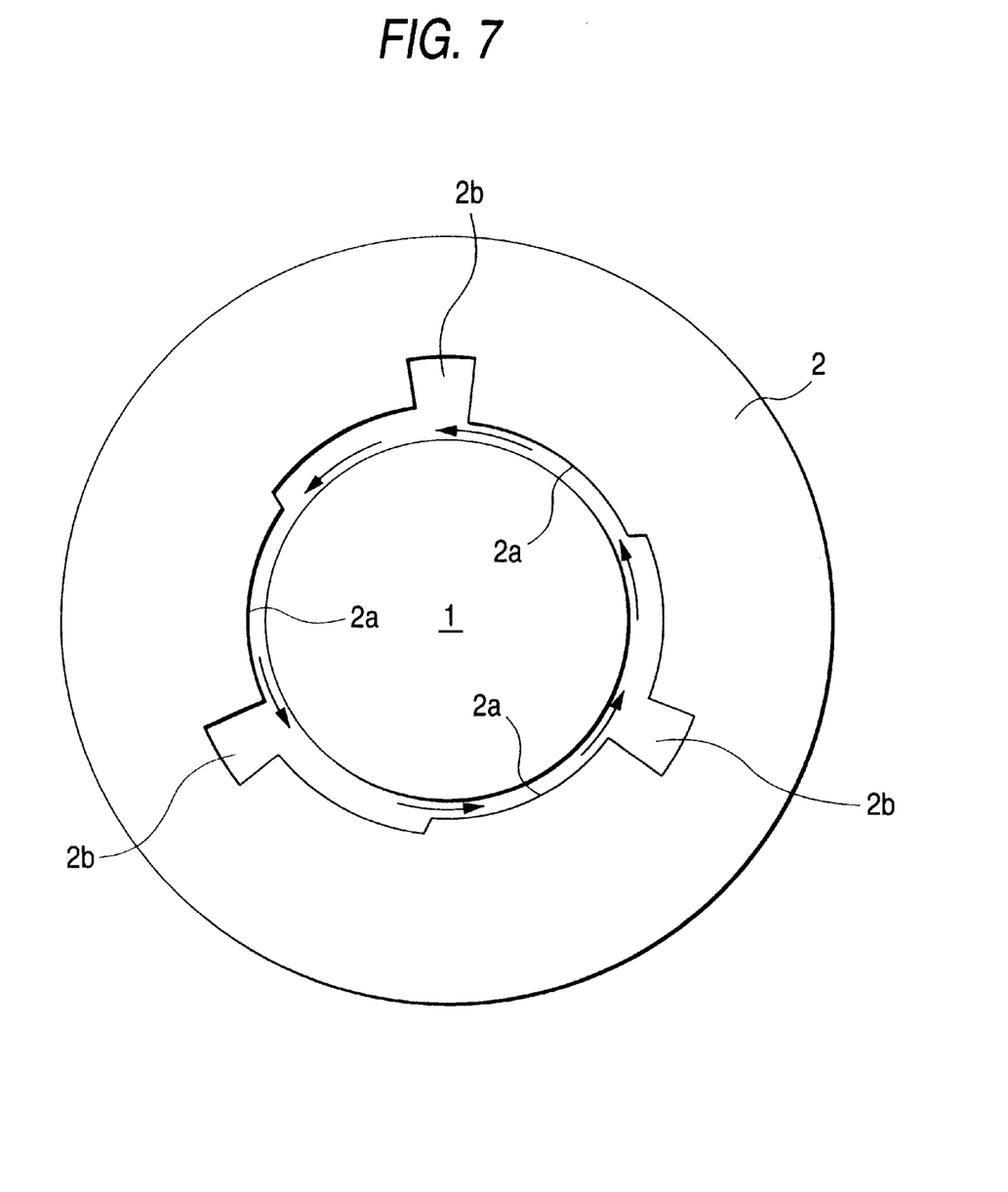
FIG. 7 is a plan view of the structure of a conventional step dynamic pressure bearing device.

In some of the dynamic pressure bearing devices of this type, as means for generating such dynamic pressure, there is used a dynamic pressure generating groove which is formed in a herringbone shape, a spiral shape or the like. However, especially, in the case of a journal bearing device, there have been conventionally proposed a step dynamic pressure bearing device and a taper dynamic pressure bearing device in both of which the above-mentioned dynamic pressure generating groove is not used. Here, FIG. 7 shows a structure of an ordinary step dynamic pressure bearing device. In this structure, as shown in FIG. 7, in the inner peripheral wall surface of a bearing member 2 which surrounds the periphery of a shaft member 1, in more particular, at a plurality of portions (in FIG. 7, at three portions) thereof, there are respectively disposed a plurality of dynamic pressure generating portions 2a each including a projecting surface which projects in a step-shaped manner toward the central side of the bearing member 1.

While the dynamic pressure generating portions 2a are disposed intermittently along the peripheral direction of the bearing member 2 in two or more (in FIG. 7, three), in narrow spaces respectively formed between these dynamic pressure generating portions 2a and the outer peripheral surface of the shaft member 1, if a lubricating fluid such as oil, air or the like can be squeezed and thus pressurized, then there can be generated bearing dynamic pressures respectively in their corresponding narrow spaces. By the way, in the taper dynamic pressure bearing device, the above-mentioned dynamic pressure generating portions 2a each including a projecting surface do not project in a step-shaped manner but project through a continuously inclined surface (tapered surface).

In FIG. 7, in a flow direction (in FIG. 7, in the counter-clockwise direction) of the lubricating fluid shown by an arrow mark, on the downstream side of the respective dynamic pressure generating portions 2a, there are disposed negative pressure cancel portions 2b respectively formed of recess-shaped separate grooves which are formed so as to be continuous with their associated dynamic pressure generating portions 2a. These negative pressure cancel portions 2b respectively consisting of recess-shaped separate grooves are formed in such a manner that they are suddenly depressed from their associated dynamic pressure generating portions 2a toward the outside of the radial direction of the bearing member 2; and, since the lubricating fluid is allowed to flow into enlarged spaces defined by these negative pressure cancel portions 2b, there can be avoided the formation of useless negative pressure areas. That is, if the negative pressure cancel portions 2b respectively consisting of recess-shaped separate grooves are not formed, there can be generated a negative pressure, thereby causing external disturbance. This external disturbance lowers the load capacity of the step dynamic pressure bearing device to thereby reduce greatly the dynamic pressures in the radial direction of the step dynamic pressure bearing device, which makes it impossible for the step dynamic pressure bearing device to obtain a good dynamic pressure characteristic.

As described above, the negative pressure cancel portions 2a are components which are indispensable to both of the step dynamic pressure bearing device and taper dynamic pressure bearing device. And, in order to be able to obtain a good dynamic pressure characteristic, preferably, the negative pressure cancel portions 2a may be as deep and narrow as possible. Normally, they are formed so as to have a depth of 20 $\mu$m or more and, when forming such deep and narrow groove, generally, there is employed a cutting operation. The reason for this is that it is difficult to form a deep and narrow recess-shaped groove by other working operations than the cutting operation.

However, to add the above-mentioned cutting operation to the manufacturing process of the dynamic pressure bearing device not only means to add a step which is completely separate from the other steps of the present manufacturing process, but also raises a problem that the cutting operation step itself cannot provide a good operation efficiency, thereby lowering the productivity of the dynamic pressure bearing device greatly, which leads to the high cost of the dynamic pressure bearing device. More specifically, in the above-mentioned step dynamic pressure bearing device and taper dynamic pressure bearing device, if a molding operation or the like is employed, then the main portions and dynamic pressure generating portions 2a of the dynamic pressure bearing devices can be manufactured at a low cost and with high efficiency; but, if the above-mentioned cutting operation step of cutting the negative pressure cancel portions 2b respectively consisting of the above-mentioned recess-shaped separate grooves are added, then the production costs of the these bearing devices increase greatly.

SUMMARY OF THE INVENTION

Accordingly, it is an object of the invention to provide a dynamic pressure bearing device which is simple in structure and allows efficient production of its negative pressure cancel portions and a method for manufacturing such dynamic pressure bearing device.

According to an aspect of the present invention, there is provided a dynamic pressure bearing device, comprising:
A dynamic pressure bearing device, comprising:

a shaft member;

a bearing member disposed so as to be relatively rotated with respect to said shaft member;

a dynamic pressure generating section formed in at least one of said shaft member and bearing member, said dynamic pressure generating section including:

a plurality of dynamic pressure generating portions respectively arranged intermittently along the peripheral direction of one of said shaft member and bearing member;

a projecting surface for pressurizing a lubricating fluid, said projecting surface projects in the radial direction of one of said shaft member and bearing member toward the other; and a plurality of negative pressure cancel portions for canceling negative pressures generated together with the dynamic pressures that are generated by said plurality of dynamic pressure generating portions, said each negative pressure cancel portion interposed between the mutually adjoining ones of said plurality of dynamic pressure generating and, said negative pressure cancel portions being respectively formed of porous material and being structured in such a manner that a large number of pores of said porous material for supplying/absorbing said lubricating fluid are exposed to the surfaces of said negative pressure cancel portions.

As has been described hereinbefore, according to the invention, since a dynamic pressure bearing device is structured such that the pores of the porous material are disposed on the surfaces thereof corresponding to the negative pressure cancel portions thereof and thus the lubricating fluid is supplied to the negative pressure generating areas thereof through the pores of the negative pressure cancel portions, even if the recess-shaped grooves respectively forming the negative pressure cancel portions are formed shallow in depth and wide in width, or even if such grooves are not formed but the surfaces are formed in a plane shape, the present dynamic pressure bearing device is able to fulfil its negative pressure cancel function in a sufficient manner. Thanks to this, there is eliminated the need for use of the conventional groove shape which is deep and narrow and, therefore, the negative pressure cancel portions can be formed at a low cost by inexpensive means such as by molding or the like without employing an expensive operation such as a cutting operation. That is, according to the invention, there can be provided a dynamic pressure bearing device which is simple in structure, allows efficient formation of its negative pressure cancel portions, and can be manufactured at a very low cost.

Also, according to the invention, by properly setting the respective pore ratios of the dynamic pressure generating portions and dynamic pressure auxiliary portions with respect to the pore ratio of the negative pressure cancel portions, the whole of the shaft member or bearing member, in which the dynamic pressure generating portions are to be formed, can be made of integrally formed porous material by molding or the like at a low cost. This makes it possible to enhance the above-mentioned effects further.

Further, the invention can be applied not only to a step dynamic pressure bearing device but also a taper dynamic pressure bearing device in a similar manner and, in both of them, there can be obtained a similar effect.

Still further, according to the invention, since the sintered metal material is used as the porous material, the pores of the negative pressure cancel portions can be obtained in a proper manner and also the sizing step of crushing the pores in the dynamic pressure generating portions and dynamic pressure auxiliary portions can be carried out easily and properly. This can enhance the above-mentioned effects still further.

In addition, since the present dynamic pressure bearing device can be made to execute a self-lubricating operation, the bearing characteristic thereof can be enhanced and also the freedom of material selection can be enlarged. Due to combination of these effects with the above-mentioned effects, the dynamic pressure bearing device according to the invention can be manufactured at a further lower cost.

DETAILED DESCRIPTION OF PREFERRED EMBODIMENTS

Now, description will be given below in detail of the preferred embodiments of a dynamic pressure bearing device according to the invention which are respectively applied to a spindle motor for driving a hard disk of a so called rotatable shaft type with reference to the accompanying drawings.

Figure 6:
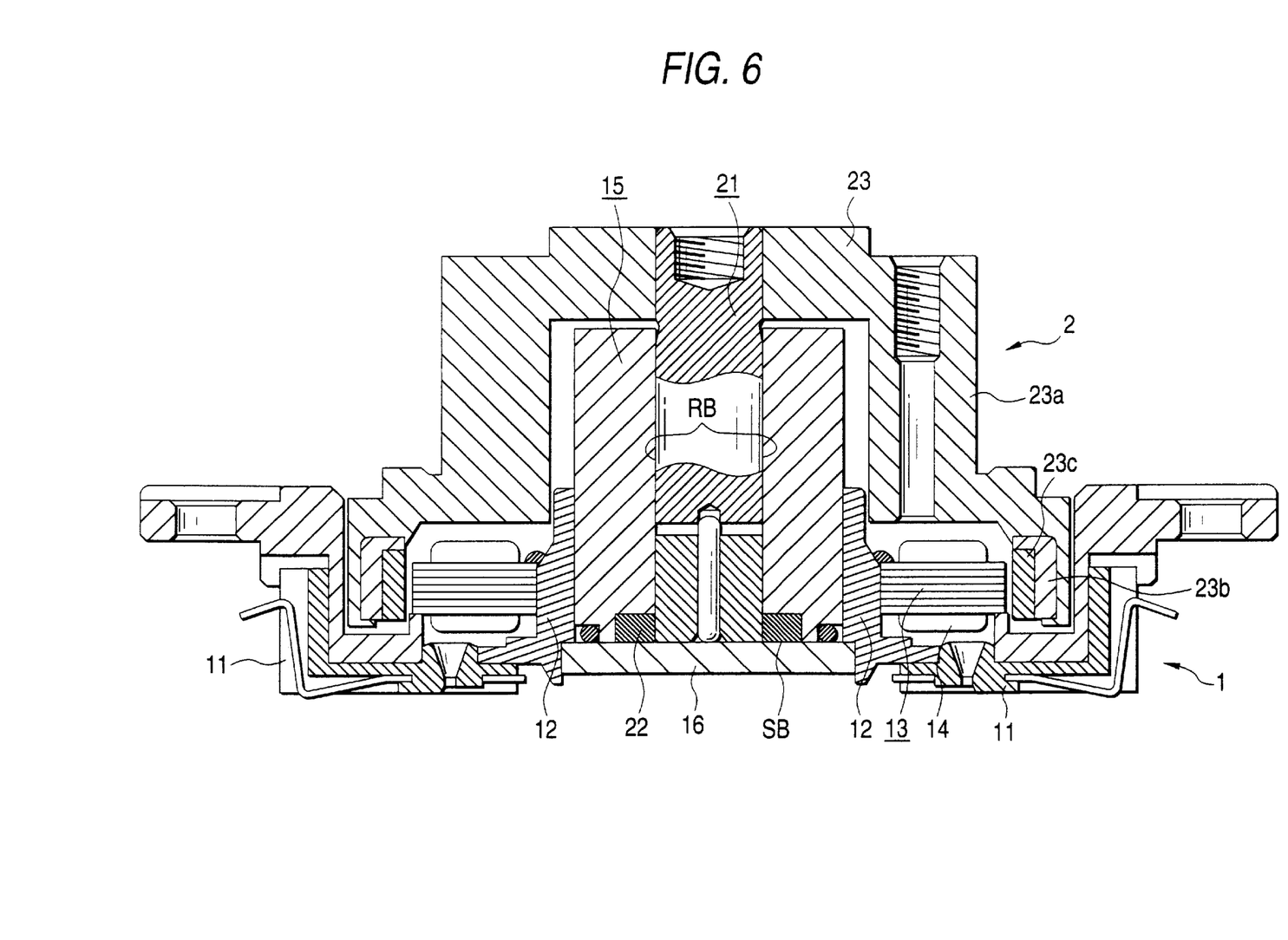
FIG. 6 is a transverse section view of an HDD drive motor taken as an example of a rotary drive device incorporating therein a dynamic pressure bearing device according to the invention.

At first, describing the whole structure of an HDD spindle motor shown in FIG. 6, the present HDD spindle motor includes a stator set 1 serving as a fixed member and a rotor set 2 serving as a rotary member assembled to the stator set 1 from above in FIG. 6. Out of these sets 1 and 2, the stator set 1 is structured such that it includes a frame 11 screwed onto the fixed base (not shown) side and a bearing holder 12 which is disposed on and formed integrally with the substantially central portion of the frame 11; and, the bearing holder 12 is further formed in a substantially hollow cylindrical body of a relatively large diameter in such a manner that it projects from the frame 11 in the axial direction (in FIG. 6, in the upper direction) thereof.

On the outer peripheral wall surface of the bearing holder 12, there is fitted and mounted a stator core 13 including a plurality of radially extending salient pole portions; and, around the respective salient pole portions of the stator core 13, there is wound a winding 14.

On the other hand, on the inner peripheral wall surface of the bearing holder 12, there is fitted and mounted a bearing sleeve 15 which forms a bearing member of a dynamic pressure bearing device. Although the detailed structure of the bearing sleeve 15 will be discussed later, into a hollow hole portion formed in the central portion of the bearing sleeve 15, there is inserted a rotary shaft 21 which forms a shaft body of the rotor set 2, while the rotary shaft 21 is supported by the bearing sleeve 15 in such a manner that it can be freely rotated. The inner peripheral wall surface of a center hole formed in the central portion of the bearing sleeve 15 in such a manner as to extend through the bearing sleeve 15 central portion is disposed so as to be opposed to the outer peripheral wall surface of the rotary shaft 21 along their respective peripheries with a narrow clearance of several μm—several decades of μm extending in the radial direction thereof between them. These mutually opposing wall surfaces are respectively formed as radial dynamic pressure bearing surfaces, thereby forming a radial dynamic pressure bearing portion RB.

And, into the narrow clearance which forms the radial dynamic pressure bearing portion RB, there is continuously poured or charged a given lubricating fluid such as oil, a magnetic fluid, air or the like. Due to a pumping action which is generated in the radial dynamic pressure bearing portion RB as a result of the rotation of the rotary shaft 21, the lubricating fluid is caused to increase in pressure, thereby generating a dynamic pressure. Owing to the dynamic pressure generated in the lubricating fluid, the rotating rotary shaft 21 is floated up in the radial direction and supported there.

Further, to the open portion (in FIG. 6, which is formed on the lower end side) of the bearing holder 12, there is closely adhered a disk-shaped thrust plate 16 in such a manner that it closes the present open portion. On the other hand, into the portion (in FIG. 6, which is formed on the lower end side) of the rotary shaft 21, there is pressure inserted an annular-shaped thrust ring 22 in such a manner that it is situated adjacent to but is opposed to the thrust plate 16 in the axial direction of the HDD spindle motor. In the two end surfaces of the thrust ring 22 in the axial direction thereof, there are formed dynamic pressure generating grooves each having a spiral shape or the like. The two end faces of the thrust ring 22 in the axial direction thereof are respectively disposed such that they are opposed to the inner end face (in FIG. 6, the upper end face) of the thrust plate 16 and the end face of the bearing sleeve 15 with a narrow clearance of several μm—several decades of μm in the axial direction between them. And, the thrust plate 16 as well as the mutually opposing end faces of the sleeve 15 and thrust ring 22 cooperate together in forming a thrust dynamic pressure bearing portion SB.

Into the narrow clearance forming the thrust dynamic pressure bearing portion SB, there is continuously poured or charged a given lubricating fluid such as oil, a magnetic fluid, air or the like from the previously described radial dynamic pressure bearing portion RB; and, due to a pumping action which is generated by the dynamic pressure generating grooves (not shown) each having a spiral shape or the like formed in at least one of the above-mentioned mutually opposing thrust dynamic pressure surfaces when the rotary shaft 21 is rotated, the thus charged lubricating fluid is caused to rise in pressure to thereby generate a dynamic pressure and, therefore, owing to the dynamic pressure generated by the lubricating fluid, the rotating rotary shaft 21 is floated up and supported there.

On the other hand, to the opposite side end portion (that is, in FIG. 6, the upper end portion) of the rotary shaft 21, there is fitted and fixed a rotary hub 23 which is used to support a given recording medium (not shown). The rotary hub 23 includes a substantially cylindrical-shaped barrel portion 23a on the outer peripheral portion of which a recording medium such as a magnetic disk or the like can be mounted; and, on the inner peripheral wall surface of the lower end (in FIG. 6) open portion of the barrel portion 23a, there is mounted an annular-shaped drive magnet 23c through a back yoke 23b. The drive magnet 23c is disposed such that it is situated adjacently to and opposed to the salient pole portion outer end surface of the previously discussed stator core 13 in such a manner to surround the periphery thereof.

Next, description will be given below of the respective structures of the bearing holder 12 forming the previously described dynamic pressure bearing device and the bearing sleeve 15 fitted with and mounted on the inner peripheral wall surface of the bearing holder 12.

Figure 1:
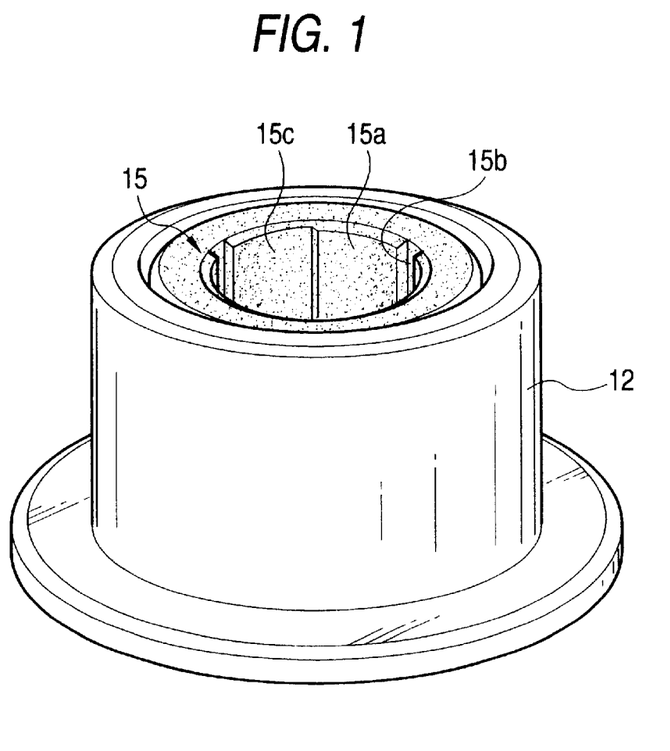
FIG. 1 is a perspective view of the appearance of the structure of a step dynamic pressure bearing device according to an embodiment of the invention.
Figure 2:
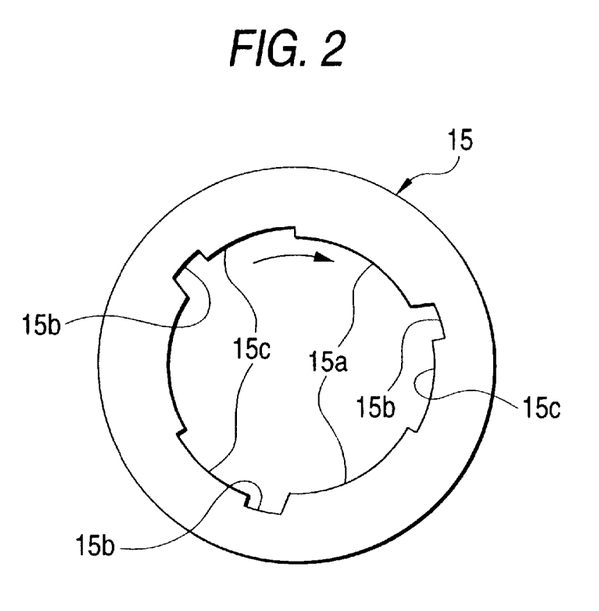
FIG. 2 is a typical plan view of a bearing member employed in the step dynamic pressure bearing device shown in FIG. 1.
Figure 3:
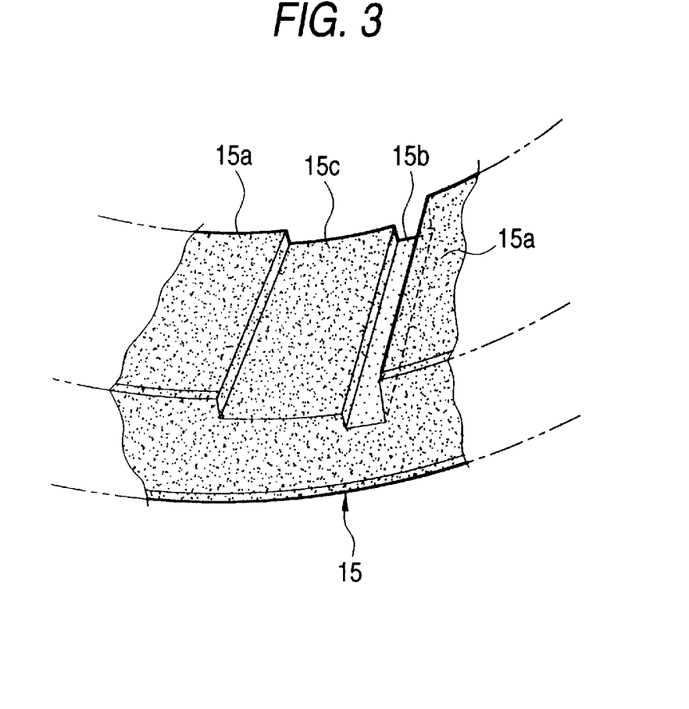
FIG. 3 is a partially enlarged perspective view of the structure of the inner wall surface of the bearing member shown in FIG. 2.

In an embodiment shown in FIGS. 1, 2 and 3, for the purpose of easy understanding, the bearing holder 12 and bearing sleeve 15 are shown in such a manner that the heights of the bearing holder 12 and bearing sleeve 15 in the axial direction thereof are almost the same. The bearing sleeve 15, which is used to form a step dynamic pressure bearing device, is formed of substantially hollow cylindrical-shaped porous material such as sintered metal material formed by powder metallurgy. As the metal material, there is used copper alloy or the like.

As described above, the bearing sleeve 15 is pressure inserted into the interior side of the bearing holder 12 and also, between the inner peripheral wall surface of the bearing sleeve 15 and the outer peripheral wall surface of the rotary shaft 21 (not shown in FIGS. 1, 2 and 3), there is poured or charged a given lubricating fluid such as oil, a magnetic fluid, air or the like; and, on the inner peripheral wall surface of the bearing sleeve 15, there are formed dynamic pressure generating portions 15a which are used to pressurize the lubricating fluid. Each of the dynamic pressure generating portions 15a includes an arc-shaped surface which projects inwardly in the radial direction of the bearing sleeve 15 toward the rotary shaft 21 side. In the present embodiment, three dynamic pressure generating portions 15a are intermittently arranged along the peripheral direction of the bearing sleeve 15. And, these three dynamic pressure generating portions 15a are also respectively opposed to the outer peripheral surface of the rotary shaft 21 with a narrow clearance of several μm—several decades of μm between them while they intermittently surround the outer periphery of the rotary shaft 21, thereby forming the radial dynamic pressure bearing portion RB that has been discussed above.

Also, between these three dynamic pressure generating portions 15a, there are sequentially interposed three dynamic pressure auxiliary portions 15c, 15c and 15c which are used to maintain their associated dynamic pressures that are respectively generated by their associated dynamic pressure generating portions 15a, as well as three negative pressure cancel portions 15b, 15b and 15b which are respectively used to cancel the negative pressures that are generated together with the above generated dynamic pressures. That is, in the flow direction of the lubricating fluid which is shown by an arrow mark in FIG. 2, the three dynamic pressure generating portions 15a, three negative pressure cancel portions 15b, and three dynamic pressure auxiliary portions 15c are respectively arranged in this order; and, each one of the three dynamic pressure generating portions 15a, each one of the three negative pressure cancel portions 15b, and each one of the three dynamic pressure auxiliary portions 15c are arranged so as to form a set.

And, in each set, the negative pressure cancel portion 15b is formed of a recess-shaped groove which is recessed from the projecting surface of its associated dynamic pressure generating portion 15a outwardly in the radial direction of the bearing sleeve 15 in a step manner with a level difference of the order of 10 μm between them; and, the negative pressure cancel portion 15b is also formed so that the groove width of the recess-shaped groove thereof is equal to or more than 30 μm. On the other hand, the dynamic pressure auxiliary portion 15c includes an arc-shaped surface which connects together the projecting surface of the dynamic pressure generating portion 15a and the bottom surface of the recess-shaped groove of the negative pressure cancel portion 15b with a level difference between them; and, the amount of the level difference of the arc-shaped surface of the dynamic pressure auxiliary portion 15c is set at an amount which corresponds to the height of the middle position between the projecting surface of the dynamic pressure generating portion 15a and the bottom surface of the recess-shaped groove of the negative pressure cancel portion 15b.

As described above, the whole of the bearing sleeve 15 serving as a bearing member is formed of the sintered metal material which belongs to the porous material and, therefore, by nature, in the respective inner peripheral surfaces of the dynamic pressure generating portions 15a, negative pressure cancel portions 15b, and dynamic pressure auxiliary portions 15c, there are formed a large number of pores in such a manner that they are exposed to their respective surfaces; and, the respective portions 15a, 15b and 15c are formed such that pore ratios in the respective portions, that is, ratios of the areas of pores to the whole surface areas in the respective portions are different from each other. More specifically, on the bottom surfaces of the recess-shaped grooves of the negative pressure cancel portions 15b, a large number of pores are left and exposed just as they are formed in their blank or mother material in order to be able to supply the lubricating fluid through the present recess-shaped groove bottom surface; and, on the other hand, the respective inner peripheral surfaces of the dynamic pressure generating portions 15a and dynamic pressure auxiliary portions 15c are treated by sizing or the like so that the pores thereof are crushed. By the way, the negative pressure cancel portions 15b, dynamic pressure generating portions 15a and dynamic pressure auxiliary portions 15c are respectively formed in a uniform shape in the axial direction of the bearing sleeve 15.

The degrees of sizing with respect to the respective inner peripheral surfaces of the dynamic pressure generating portions 15a and dynamic pressure auxiliary portions 15c are different, that is, the pores that have been by nature contained in the porous material are crushed at rates which are mutually different from each other. Specifically, the pores of the respective inner peripheral surfaces of the dynamic pressure generating portions 15a and dynamic pressure auxiliary portions 15c are crushed in such a manner that, when compared with a pore ratio $P_G$ in the bottom surfaces of the recess-shaped grooves of the negative pressure cancel portions 15b, pore ratios $P_L$ and $P_W$ in the respective inner peripheral surfaces of the dynamic pressure generating portions 15a and dynamic pressure auxiliary portions 15c are fairly small. That is, these pore ratios are set so as to have the following relationship:

$$P_L, P_W \ll P_G$$

More specifically, the pore ratio $P_L$ of the dynamic pressure generating portions 15a is set at a value smaller than 10%, whereas the pore ratio $P_G$ of the negative pressure cancel portions 15b is set at a value larger than 20%. That is, the respective pore ratios are set in the following manner:

$$P_L < 10\%$$

$$P_G > 20\%$$

$$P_L < P_W$$

The pore ratio $P_L$ in the projecting surfaces of the dynamic pressure generating portions 15a is set smaller than the pore ratio $P_W$ in the inner peripheral surfaces of the dynamic pressure auxiliary portions 15c. However, the pore ratios $P_L$ and $P_W$ may be set equal to each other. And, in the dynamic pressure auxiliary portions 15c, the pressure of the lubricating fluid increases gradually along the peripheral direction thereof and, in the dynamic pressure generating portions 15a, the pressure of the lubricating fluid becomes the highest.

To manufacture the bearing sleeve 15 consisting of the thus shaped sintered metal body, as described before, there is used a powder metallurgy method. That is, blank material or metal powder is charged into a mold including a cavity which corresponds to the blank shape of the bearing sleeve 15, the thus charged metal powder is next compressed, and, after then, the metal powder is sintered. At the then time, on the inner peripheral wall surface of the thus molded blank material, there are molded or formed only the negative pressure cancel portions 15b, whereas the respective surfaces of the dynamic pressure generating portions 15a and dynamic pressure auxiliary portions 15c are present almost on the same circumference. And, in a next step, that is, in a sizing step, the dynamic pressure generating portions 15a and dynamic pressure auxiliary portions 15c are formed but separately.

That is, with respect to the inner peripheral wall surface of the thus molded blank material of the bearing sleeve 15, the negative pressure cancel portions 15b are left as they are, while the other portions than the negative pressure cancel portions 15b, namely, the portions corresponding to the respective inner peripheral surfaces of the dynamic pressure generating portions 15a and dynamic pressure auxiliary portions 15c are sized, whereby the given level differences are formed and the pores are crushed. By this sizing step, at first, the surfaces of the dynamic pressure auxiliary portions 15c are formed. After then, a re-sizing operation is executed to thereby crush the pores that correspond to the projecting surfaces of the dynamic pressure generating portions 15a, so that the projecting surfaces of the dynamic pressure generating portions 15a are formed. And, after the thus obtained product is washed, if the product is oil treated in such a manner that it includes oil therein, then the product is completed as the bearing sleeve 15.

By the way, the re-sizing step can be replaced by the following operation: that is, when the bearing sleeve 15 is pressure inserted into the bearing holder 12, if it is pressure inserted in such a state that a mandrel or the like is fitted into a hole formed in the bearing sleeve 15, then the bearing sleeve 15 can be re-sized.

In the thus formed bearing sleeve 15 according to the present embodiment, the lubricating fluid is supplied to the negative pressure generating area thereof through a large number of pores contained in the bottom surfaces of the recess-shaped grooves forming the negative pressure cancel portions 15b. Therefore, even if the recess-shaped grooves of the negative pressure cancel portions 15b are formed shallow in depth and wide in width, a sufficient negative pressure cancel function can be fulfilled. This eliminates the need for provision of the conventional recess-shaped groove that is deep and narrow: that is, the negative pressure cancel portions can be formed at a low cost by inexpensive means such as by molding or the like without using an expensive operation such as a cutting operation or the like.

Also, according to the present embodiment, since the whole of the bearing sleeve 15, in which the dynamic pressure generating portions 15 are to be formed, is made of integrally formed porous material, and the respective pore ratios of the dynamic pressure generating portions 15a and dynamic pressure auxiliary portions 15c are set fairly smaller than the pore ratio of the negative pressure cancel portion 15b, the whole of the bearing sleeve 15 can be formed by molding at a low cost.

Further, as in the present embodiment, if the sintered metal material is employed as the porous material of the bearing sleeve 15, then there can be obtained proper pores in the negative pressure cancel portions 15b and also a pore crushing step (that is, a sizing step) can be executed easily and properly on the dynamic pressure generating portions 15a or dynamic pressure auxiliary portions 15c, thereby being able to enhance the productivity of the bearing sleeve 15.

Figure 4:
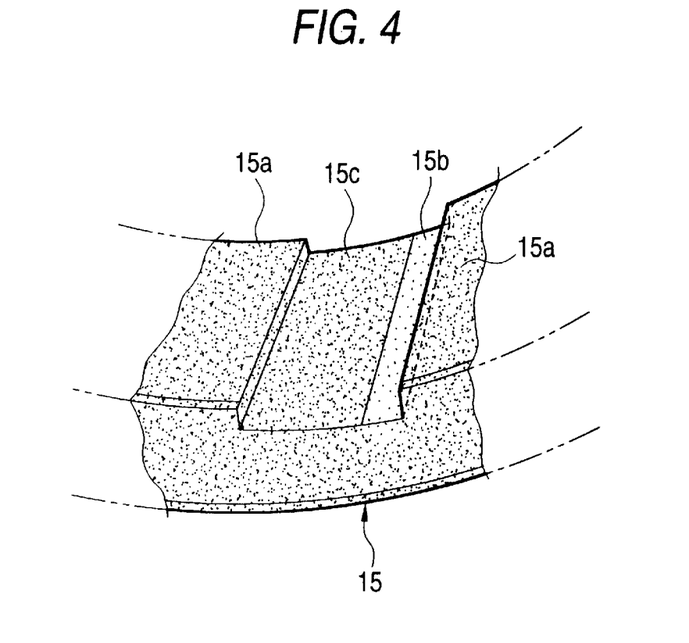
FIG. 4 is a partially enlarged perspective view of the portion of another embodiment of a bearing member according to the invention that corresponds to the inner wall surface of the bearing member shown in FIG. 2.

By the way, for example, as shown in FIG. 4, depending on the kinds of material and the manner of setting the forming conditions of the bearing sleeve 15, the negative pressure cancel portions 15b can also be formed flush with the dynamic pressure auxiliary portions 15c with no level difference between them.

Figure 5:
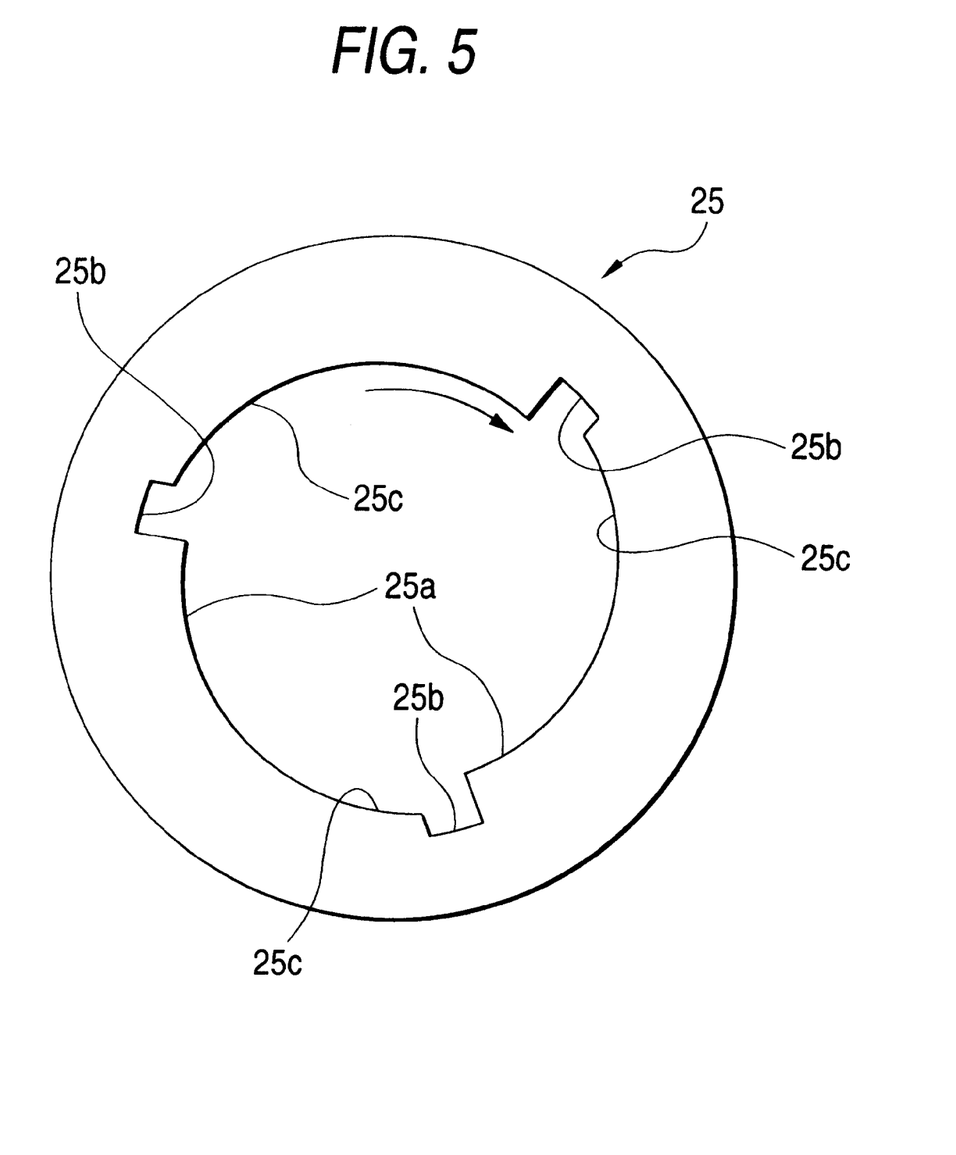
FIG. 5 is a typical plan view of the structure of a taper dynamic pressure bearing device according to another embodiment of the invention.

On the other hand, in an embodiment of a taper dynamic pressure bearing device shown in FIG. 5, differently from the embodiment of the step dynamic pressure bearing device in which there are formed the level differences (steps) between the dynamic pressure generating portions 15a and negative pressure cancel portions 15b, there is not formed any level difference (step), but a dynamic pressure auxiliary portion 25c is formed so as to be inclined in the peripheral direction thereof toward a dynamic pressure generating portion 25a in a tapered manner, while the dynamic pressure generating portion 25a and negative pressure cancel portion 25b are continuously connected to each other by a dynamic pressure auxiliary portion 25c which is formed of the taperedly inclined surface. The remaining portions of the structure of the embodiment of the taper dynamic pressure bearing device are similar to those of the previously described embodiment of the step dynamic pressure bearing device and, therefore, the description thereof is omitted here. However, in the embodiment of the taper dynamic pressure bearing device as well, there can be obtained similar operations and effects to the previously described embodiment of the step dynamic pressure bearing device.

Although the embodiments of the invention realized by the present inventors have been described heretofore in detail, the invention is not limited to the above-mentioned embodiments but, of course, other various changes and modification are also possible without departing the subject matter of the invention.

For example, although the dynamic pressure generating portions and negative pressure cancel portions are formed by threes in the above-mentioned embodiments, the invention is not limited to this but, even when dynamic pressure generating portions and negative pressure avoiding portions are formed by twos or by fours or more, the invention can also be applied similarly.

Also, a dynamic pressure bearing device according to the invention can also be applied similarly not only to a dynamic pressure bearing device of the above-mentioned rotatable shaft type but also to a dynamic pressure bearing device of a fixed shaft type. Further, the invention is not limited to such HDD spindle motor as employed in the above-mentioned embodiments but can also be applied similarly to other various rotary devices.

As has been described hereinbefore, according to the invention, since a dynamic pressure bearing device is structured such that the pores of the porous material are disposed on the surfaces thereof corresponding to the negative pressure cancel portions thereof and thus the lubricating fluid is supplied to the negative pressure generating areas thereof through the pores of the negative pressure cancel portions, even if the recess-shaped grooves respectively forming the negative pressure cancel portions are formed shallow in depth and wide in width, or even if such grooves are not formed but the surfaces are formed in a plane shape, the present dynamic pressure bearing device is able to fulfil its negative pressure cancel function in a sufficient manner. Thanks to this, there is eliminated the need for use of the conventional groove shape which is deep and narrow and, therefore, the negative pressure cancel portions can be formed at a low cost by inexpensive means such as by molding or the like without employing an expensive operation such as a cutting operation. That is, according to the invention, there can be provided a dynamic pressure bearing device which is simple in structure, allows efficient formation of its negative pressure cancel portions, and can be manufactured at a very low cost.

Also, according to the invention, by properly setting the respective pore ratios of the dynamic pressure generating portions and dynamic pressure auxiliary portions with respect to the pore ratio of the negative pressure cancel portions, the whole of the shaft member or bearing member, in which the dynamic pressure generating portions are to be formed, can be made of integrally formed porous material by molding or the like at a low cost. This makes it possible to enhance the above-mentioned effects further.

Further, the invention can be applied not only to a step dynamic pressure bearing device but also a taper dynamic pressure bearing device in a similar manner and, in both of them, there can be obtained a similar effect.

Still further, according to the invention, since the sintered metal material is used as the porous material, the pores of the negative pressure cancel portions can be obtained in a proper manner and also the sizing step of crushing the pores in the dynamic pressure generating portions and dynamic pressure auxiliary portions can be carried out easily and properly. This can enhance the above-mentioned effects still further.

In addition, since the present dynamic pressure bearing device can be made to execute a self-lubricating operation, the bearing characteristic thereof can be enhanced and also the freedom of material selection can be enlarged. Due to combination of these effects with the above-mentioned effects, the dynamic pressure bearing device according to the invention can be manufactured at a further lower cost.

What is claimed is:

1. A dynamic pressure bearing device comprising:
   a shaft member;
   a bearing member disposed so as to be relatively rotated with respect to said shaft member;
   a dynamic pressure generating section formed in at least one of said shaft member and bearing member, said dynamic pressure generating section including:
      a plurality of dynamic pressure generating portions respectively arranged intermittently along the peripheral direction of one of said shaft member and bearing member;

a projecting surface for pressurizing a lubricating fluid, said projecting surface projects in the radial direction of one of said shaft member and bearing member toward the other; and a plurality of negative pressure cancel portions for canceling negative pressures generated together with the dynamic pressures that are generated by said plurality of dynamic pressure generating portions, said each negative pressure cancel portion interposed between the mutually adjoining ones of said plurality of dynamic pressure generating portions and, said negative pressure cancel portions being respectively formed of porous material and being structured in such a manner that a large number of pores of said porous material for supplying/absorbing said lubricating fluid are exposed to the surfaces of said negative pressure cancel portions.

2. A dynamic pressure bearing device as set forth in claim 1, wherein said dynamic pressure generating portions are respectively formed of porous material, and the relationship between the pore ratio $P_L$ of said projecting surfaces of said porous material forming said dynamic pressure generating portions and the pore ratio $P_G$ of said porous material forming said negative pressure cancel portions satisfies the following condition:

$$P_L \ll P_G.$$

3. A dynamic pressure bearing device as set forth in claim 2, further comprising:

a plurality of dynamic pressure auxiliary portions for maintaining dynamic pressures generated by said dynamic pressure generating portions, said each dynamic pressure auxiliary portion being interposed between the mutually adjoining ones of said dynamic pressure generating portions and said negative pressure cancel portions respectively formed of said porous material, said dynamic pressure auxiliary portions formed of the same porous material as said porous material forming said dynamic pressure generating portions and said negative pressure cancel portions, and, the relationship between the pore ratio $P_W$ of the surfaces of said porous material forming said dynamic pressure auxiliary portions and the pore ratio $P_L$ of said projecting surfaces of said porous material forming said dynamic pressure generating portions satisfies the following condition:

$$P_L \leq P_W.$$

4. A dynamic pressure bearing device as set forth in claim 3, wherein each of the surfaces of said dynamic pressure auxiliary portions is defined by an arc-shaped surface which is recessed from the projecting surface of said dynamic pressure generating portion through a level difference.

5. A dynamic pressure bearing device as set forth in claim 2, wherein each of the surfaces of said dynamic pressure auxiliary portions is defined by a tapered inclined surface which connects continuously the projecting surface of said dynamic pressure generating portion to the bottom surface of the groove of said negative pressure cancel portions.

6. A dynamic pressure bearing device as set forth in claim 2, wherein said porous material is sintered metal material formed by powder metallurgy.

7. A dynamic pressure bearing device as set forth in claim 1, wherein said porous material is sintered metal material formed by powder metallurgy.

* * * * *